US008714793B2

(12) United States Patent
Rice

(10) Patent No.: US 8,714,793 B2
(45) Date of Patent: May 6, 2014

(54) LED HEADLIGHT WITH ONE OR MORE STEPPED UPWARD-FACING REFLECTORS

(75) Inventor: Lawrence M. Rice, Hillsboro, NH (US)

(73) Assignee: OSRAM SYLVANIA Inc., Danvers, MA (US)

( * ) Notice: Subject to any disclaimer, the term of this patent is extended or adjusted under 35 U.S.C. 154(b) by 162 days.

(21) Appl. No.: 13/545,323

(22) Filed: Jul. 10, 2012

(65) Prior Publication Data

US 2014/0016342 A1 Jan. 16, 2014

(51) Int. Cl.

| | |
|---|---|
| ***F21V 13/04*** | (2006.01) |
| ***F21S 8/10*** | (2006.01) |
| ***F21V 7/09*** | (2006.01) |
| ***G02B 5/09*** | (2006.01) |

(52) U.S. Cl.
USPC ............ 362/517; 362/516; 362/518; 362/545

(58) Field of Classification Search
USPC .................................. 362/516, 517, 518, 545
See application file for complete search history.

(56) References Cited

U.S. PATENT DOCUMENTS

| | | | | |
|---|---|---|---|---|
| 6,296,376 | B1 | 10/2001 | Kondo et al. | |
| 6,607,295 | B2 | 8/2003 | Hayakawa | |
| 6,814,480 | B2 * | 11/2004 | Amano | 362/545 |
| 7,281,833 | B2 * | 10/2007 | Akiyama | 362/545 |
| 7,686,486 | B2 | 3/2010 | Tessnow et al. | |
| 8,292,480 | B2 * | 10/2012 | Koizumi et al. | 362/545 |
| 2003/0169600 | A1 * | 9/2003 | Amano | 362/545 |
| 2010/0118558 | A1 * | 5/2010 | Tsukamoto et al. | 362/517 |

* cited by examiner

*Primary Examiner* — Stephen F Husar
*Assistant Examiner* — James Cranson, Jr.
(74) *Attorney, Agent, or Firm* — Edward S. Podszus

(57) ABSTRACT

A headlight is disclosed, having separate low-beam and high beam housings. The high-beam housing includes four planar inward-facing reflectors, in the shape of a pyramid, with the high-beam LED array at the apex and a plano-convex high-beam lens at the base. The low-beam housing includes three planar inward-facing reflectors along the top and lateral sides, similarly arranged as three sides of a pyramid. The low-beam housing has one or more planar, horizontal upward-facing reflectors, disposed below the longitudinal axis of the low-beam housing. Light propagating downward from the low-beam LED array directly strikes either the incident face of the low-beam lens or exactly one upward-facing reflector. When viewed from the front of the low-beam housing, the upward-facing reflectors resemble steps that descend from a lower edge of the low-beam LED array.

15 Claims, 5 Drawing Sheets

LED HEADLIGHT WITH ONE OR MORE STEPPED UPWARD-FACING REFLECTORS

TECHNICAL FIELD

The present disclosure relates to particular optical geometries for low-beam and high-beam headlights.

BACKGROUND

Automobiles are equipped with both low-beam and high-beam outputs from their headlights. The low-beam output is usually angled downward and slightly away from oncoming traffic, in order to reduce glare for oncoming vehicles on the opposite side of the road. The high-beam output is brighter and lacks the directional requirements of the low-beam output, and as such is suitable only when alone on the road. Because of the different angular requirements of the low-beam and high-beam outputs, switching between low and high beams is not as straightforward as making the headlamp brighter or dimmer.

In many cases, automobiles are typically equipped with separate headlamps for the low-beam and high-beam outputs. The low-beam and high-beam headlamps are mounted adjacent to each other on the front of vehicles, and are aimed appropriately to meet the angular requirements of the low and high beams.

Historically, most of the headlamp designs have used incandescent bulbs, which have a limited lifetime and produce a relatively large amount of heat. In recent years, use of incandescent bulbs has been giving way to use of light emitting diodes (LEDs) as the light source in many lighting and illumination applications. In comparison, LEDs have a much longer lifetime and produce much less heat than their incandescent counterparts.

Accordingly, there exists an ongoing need for LED-based headlamp designs that reduce wasted light and improve the efficiency in converting output light from the LEDs into the low-beam light and high-beam light.

SUMMARY

An embodiment is a headlight 20. The headlight includes a low-beam housing 31. The low-beam housing 31 includes a generally horizontal longitudinal axis 39. The low-beam housing 31 receives light from an LED array 33 and delivers the light to a transmissive lens 32. A receiving face of the lens 32 and an emission face of the LED array 33 both have generally rectangular perimeters with generally horizontal and vertical peripheral edges. The low-beam housing 31 includes a top inward-facing reflector 12 extending from a top peripheral edge of the LED array 33 to a top peripheral edge of the lens 32. The low-beam housing 31 also includes two lateral inward-facing reflectors 2, 10. Each lateral inward-facing reflector 2, 10 extends from a side peripheral edge of the LED array 33 to a corresponding side peripheral edge of the lens 32. Each lateral inward-facing reflector 2, 10 intersects the top inward-facing reflector 12 along a curve 1, 11. The low-beam housing 31 also includes a first upward-facing reflector 34 extending away from the LED array 33 toward the lens 32. The first upward-facing reflector 34 is generally planar, generally horizontal, and disposed below the longitudinal axis 39. The first upward-facing reflector 34 receives low-beam light from the LED array 33 and reflects the low-beam light upward toward the lens 32 and toward the top inward-facing reflector 12.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
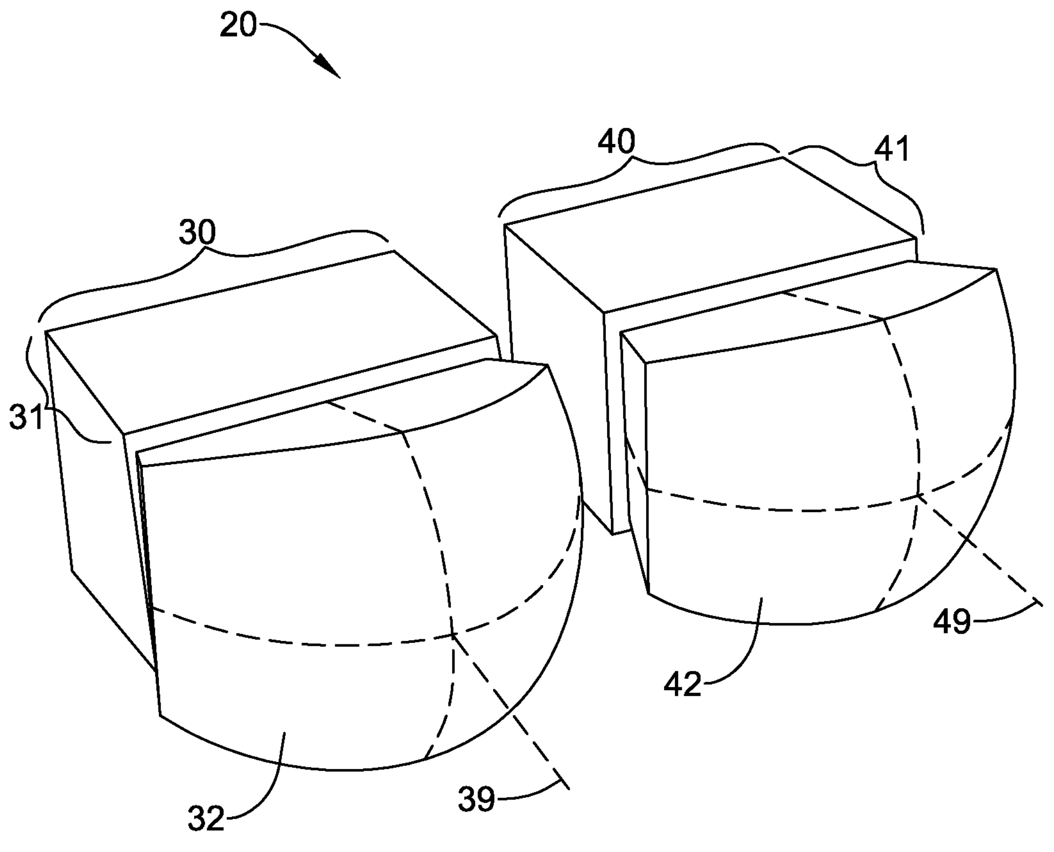
FIG. 1 is perspective drawing of an example headlight having low-beam and high-beam portions.

In this document, the directional terms “up”, “down”, “top”, “bottom”, “side”, “lateral”, “longitudinal” and the like are used to describe the absolute and relative orientations of particular elements. For these descriptions, it is assumed that light exits through a “front” of the headlight, with a spatial distribution centered around a longitudinal axis that is generally perpendicular to the front of the headlight, and is generally parallel to the ground. These descriptions include the minor angular deviations from orthogonality that account for reducing glare for oncoming vehicles. It will be understood that while such descriptions provide orientations that occur in typical use, other orientations are certainly possible. The noted descriptive terms, as used herein, still apply if the headlight is pointed upward, downward, horizontally, or in any other suitable orientation.

A headlight 20 is disclosed, having separate low-beam and high beam housings 31, 41. The high-beam housing 41 includes four planar inward-facing reflectors 103, 106, 109, 112 in the shape of a pyramid, with the high-beam LED array 43 at the apex and a plano-convex high-beam lens 42 at the base. The low-beam housing 31 includes three planar inward-facing reflectors 12, 2, 10 along the top and lateral sides, similarly arranged as three sides of a pyramid. Unlike the high-beam housing 41, the low-beam housing 31 does not have a fourth side to the pyramid along its bottom edge, but instead has one or more planar, horizontal upward-facing reflectors 34, 35, disposed below the longitudinal axis 39 of the low-beam housing 31. Light propagating downward from the low-beam LED array 33 directly strikes either the incident face of the low-beam lens 32 or exactly one upward-facing reflector 34 or 35. When viewed from the front of the low-beam housing 31, the upward-facing reflectors 34, 35 resemble steps that descend from a lower edge of the low-beam LED array 33.

The above paragraph is merely a generalization of several of the elements and features described in detail below, and should not be construed as limiting in any way.

FIG. 1 is perspective drawing of an example headlight 20 having low-beam and high-beam portions 30, 40.

For this design, the low-beam and high-beam portions 30, 40 are configured as separate, independent units that reside next to each other in the front of a vehicle. It is typical practice, and is also a U.S. legal requirement, that the low-beams are outboard, at the edges of the vehicle, with the high-beams being adjacent to the low-beams toward the center of the vehicle or beneath the low-beams. FIG. 1 shows the passenger's side headlights; it will be understood that the driver's side headlights are reversed and have a similar internal configuration.

Both the low-beam 30 and high-beam 40 portions of the headlight 20 are arranged similarly. Each portion 30, 40 is arranged as discrete units, which may be manufactured and/or sold together, but will be discussed below as being separate. For each, the light originates at an LED array (not shown in FIG. 1), enters a housing 31, 41, passes through a lens 32, 42, and emerges from the lens 32, 42 to exit the headlight 20. Note that the housings 31, 41 and the lenses 32, 42 have a generally rectangular footprint or perimeter, with generally horizontal and vertical peripheral edges. The various elements are discussed in more detail below.

For both the low-beam 30 and high-beam 40 portions, the light emerges as a highly directional beam, with most of the light being directed directly in front of the vehicle, and with a prescribed falloff in various directions. The low-beams are designed to stay out of the eyes of oncoming drivers, so the low-beam output beam typically has a sharp angular cutoff between dark and bright portions. For vertical propagation angles, there is a particular angle (sometimes known as a horizon) above which there is generally no light and below which there is bright light, so that drivers may see the road in front of the vehicle. For horizontal propagation angles, there is usually a small angling away of the hot spot, toward the shoulder of the road, to keep the light of out of oncoming traffic. This angling away from true horizontal and/or directly in front of the vehicle is typically on the order of a few degrees. These angular requirements are typically built into law, and usually vary country-to-country. In general, these angular requirements are known and well-established. It is assumed that one of ordinary skill in the art is aware of these angular requirements, and suitably builds them into the headlights. For the purposes of this document, it will be assumed that the longitudinal axes 39, 49 of the low-beam 30 and high-beam 40 portions are taken to parallel, are "generally" horizontal and extend "generally" in front of the vehicle, even though in practice there may be these small angular deviations from "true" horizontal or "truly" in front of the vehicle. The term "generally" is intended to account for these small angular deviations, which are built into the pointing and legal requirements on the headlights.

There are several known ray-tracing programs that are commonly used to simulate the performance of the headlight and optimize the housings, lenses and LED geometries. For instance, the program LucidShape is computer aided designing software for lighting design tasks, and is commercially available from the company Brandenburg GmbH, located in Paderborn, Germany. Other known computer software may also be used. In general, one of ordinary skill in the art can use the software to alter and optimize the particular shape of the lenses 32, 42, for any particular reflector configuration. The optimization process is well-known to one of ordinary skill in the art, and it is assumed herein that for a given configuration of housings 31, 41, the convex sides of the lens 38, 48 may have their shapes optimized in software, during the simulation phase of the design, and may do so without undue experimentation.

We first describe the low-beam portion 30 in detail, followed by a description of the high-beam portion 40.

Figure 2:
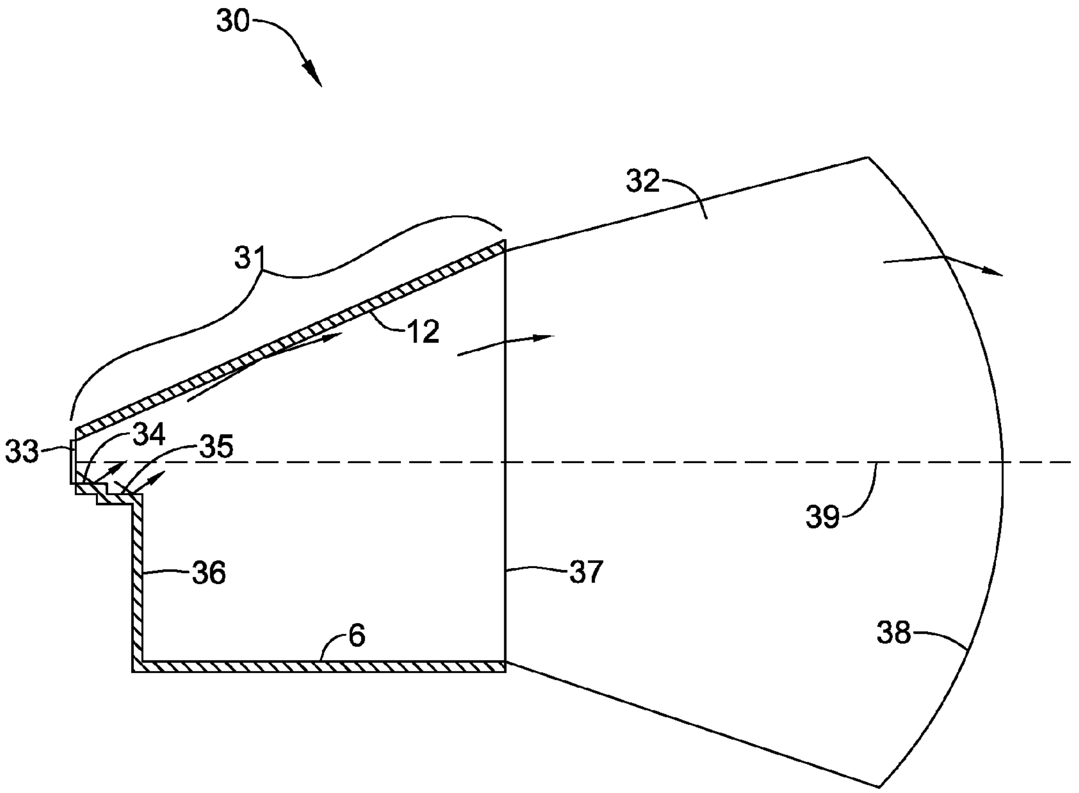
FIG. 2 is side-view cross-sectional drawing of the low-beam portion of the headlight of FIG. 1.

FIG. 2 is side-view cross-sectional drawing of the low-beam portion 30 of the headlight 20 of FIG. 1.

Light originates at a low-beam LED array 33, passes through a low-beam housing 31, in which it may undergo one or more reflections, enters a lens 32, and finally exits the lens

32 and the headlight 20. Most of the exiting light propagates at angles fairly close to the longitudinal axis 39 of the low-beam housing 31, as discussed above.

The low-beam LED array 33 may be a generally rectangular or square array of LEDs. The LEDs in a typical array are square or rectangular, with thin "dead" spaces of non-emission between the individual LEDs. The array 33 may have a square configuration, such as 2 by 2, 3 by 3, 4 by 4, and so forth. The array 33 may alternatively have a rectangular configuration, such as 1 by 2, 1 by 3, 1 by 4, 1 by 5, 2 by 3, 2 by 4, 3 by 4, and so forth. As a further alternative, the array may have an irregular shape, such a "plus" sign, a "T" shape, a generally circular or elongated footprint, and so forth. The LEDs in the array 33 may emit with a generally white light, and may be formed with a phosphorescent coating applied over a blue or violet emitter. Alternatively, the LEDs may be grouped in clusters, with each cluster having a red, green and blue LED. The differently colored LEDs in each cluster have relative brightnesses that are controlled electronically, so that that the combined red, green and blue light appears generally white to a human eye. In general, the structure and function of the low-beam LED array 33 is known.

Figure 3:
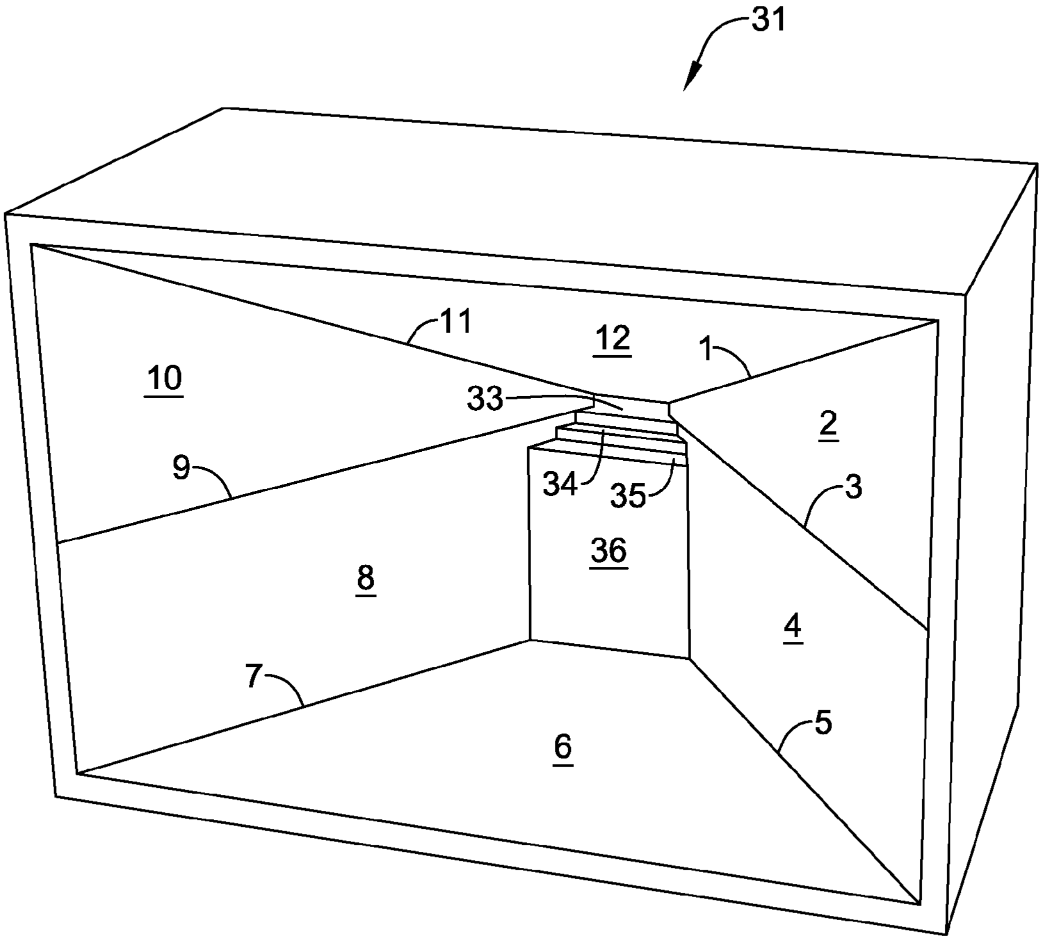
FIG. 3 is a perspective drawing showing the low-beam housing of the headlight of FIG. 1.

For the specific design in FIGS. 2 and 3, it is assumed that the low-beam LED array 33 has a generally rectangular footprint or perimeter, and is generally elongated in the horizontal direction. In FIG. 2, the elongation implies that the array dimension into/out of the page is greater than the vertical dimension. This elongation is shown more clearly in FIG. 3. More specifically, the peripheral edges of the low-beam LED array 33 are generally horizontal and generally vertical. The low-beam LED array 33 is generally centered on the longitudinal axis 39 of the low-beam housing 31, and has an emission face that is generally perpendicular to the longitudinal axis 39.

The emission pattern of the LED array 33 has an angular peak along the longitudinal axis 39, falls off at angles away the longitudinal axis 39, and falls to zero at angles perpendicular to the longitudinal axis 39. In other words, although most of the light propagates along the longitudinal axis 39 and directly strikes an incident face of the lens 32, smaller amount of light propagate slightly upward, and downward, and into/out of the page in FIG. 2. It is the intent of the reflecting surfaces in the low-beam housing 31 to "convert" these smaller amounts of light into "useful" portions of the beam, which may improve the overall efficiency and/or performance of the headlight 20.

In the cross-section of FIG. 2, we see three reflecting surfaces. All three are shown as being generally planar, and it is the intent off all three not to significantly change the collimation of the light upon reflection. For instance, it is not the intent of these reflectors to produce a collimated reflected beam from a diverging incident beam, and so forth. Although the design in FIGS. 2 and 3 uses planar surfaces, there may be some small curvature imparted to them; the reflectors may therefore be referred to as "generally" planar. The three reflectors are described below.

Along a top edge of the low-beam housing 31 is a so-called "top inward-facing reflector" 12, which may reflect rays that would otherwise miss the lens 32 back toward the lens 32. This reflector is discussed in more detail in the context of FIG. 3, below.

In addition to the top inward-facing reflector 12, next to the LED array 33, just below the longitudinal axis 39, are two "upward facing reflectors" 34 and 35. When viewed from the front of the low-beam housing 31, the upward-facing reflectors 34, 35 resemble steps that descend from a lower edge of the low-beam LED array 33.

It is the intent of the upward-facing reflectors 34, 35 to reflect light that is propagating downward, which would have otherwise struck the lower half of the lens 32 or missed the lens entirely, and redirect it toward the upper half of the lens 32, or toward the top inward-facing reflector 12, which would in turn direct it toward the upper half of the lens 32.

The motivation for such a light redirection may be found from the design of the lens 32. Lens 32 is plano-convex, with a planar side 37 facing the low-beam housing 31, and a convex side facing away from the low-beam housing 31. A starting point in designing such a lens may be an aspheric collimating lens, but there may be significant warpage of the convex surface away from the starting point to achieve the desired performance. For the lens 32 of FIG. 2, it is found that light exiting the top half of the lens 32 is refracted to propagate downward (see the arrow at surface 38 in FIG. 2), while light exiting the bottom half of the lens 32 is refracted to propagate upward. Because low-beams should limit the amount of upward-propagating light in order to avoid temporarily blinding oncoming drivers, the intent of the upward-facing reflectors 34, 35 is to take some of the light that would strike the lower half of the lens 32 and move it to the upper half of the lens 32.

There is a rule-of-thumb guideline for the size of upward-facing reflectors 34, 35. In general, it is intended that no downward-propagating light strikes the bottom side 6 of the low-beam housing 31, but in practice it is sufficient that most of the downward-propagating light is directed away from striking the bottom side 6 of the low-beam housing 31. This determines a maximum lateral extent of the second upward-facing reflector, or put more simply, this determines how far the second step "sticks out" toward the lens. In terms of the geometry of FIG. 2, if one draws a line from the topmost corner of the LED emission surface, element 33, through the top/rightmost corner of the second upward-facing reflector 35, and extends it toward the lens 32, it should strike the planar surface 37 of the lens 32 at or near the bottom. The second upward-facing reflector 35 effectively shields the bottom side 6 of the low-beam housing 31 from all light that leaves the LED array 33. Likewise, surface 36 is also shaded, and is an optically unimportant vertical surface in the low-beam housing 31. Bottom side 6 has a non-reflective finish so that if any light impinges on it, it is not reflected into the lens 32 in any significant amount.

Note that in some designs, only a single upward-facing reflector is used. In the designs of FIGS. 2 and 3, two upward-facing reflectors 34, 35 are used. In other designs, more than two upward-facing reflectors are used, which also resemble descending steps when viewed end-on.

Having explained the cross-sectional drawing of FIG. 2, we note that the full three-dimensional design is slightly more complicated. FIG. 3 is a perspective drawing looking into the low-beam housing 31 from the front, without the lens 32.

At the center of the drawing is the low-beam LED array 33. Note that the view of FIG. 3 clearly shows the horizontal elongation of the low-beam LED array 33. As in FIG. 2, the first 34 and second 35 upward-facing reflectors appear in FIG. 3 as steps descending from the lower edge of the low-beam LED array 33. Optically unimportant vertical surface 36 appears below the upward-facing reflectors 34 and 35.

There are a series of surfaces and edges surrounding elements 33-36. Because these many surfaces may be a bit confusing at first glance, the surfaces and edges are numbered according to clock position, when viewed end-on from the front of the low-beam housing 31, as in FIG. 3.

At 12 o'clock, the top inward-facing reflector 12 extends from a top peripheral edge of the LED array 33 to a top peripheral edge of the lens 32.

At 10 o'clock and 2 o'clock are two lateral inward-facing reflectors numbered, conveniently, as 2, 10. Each lateral inward-facing reflector 2, 10 extends from a side peripheral edge of the LED array 33 to a corresponding side peripheral edge of the lens 32.

Note that each lateral inward-facing reflector 2, 10 intersects the top inward-facing reflector 12 along a curve 1, 11. For the special case in which the reflectors 2, 10, 12 are all truly planar, the curves 1, 11 are lines. Note that even if there is some small curvature to the reflectors, it is intended that the reflectors meet in a relatively discontinuous corner, so that there is some "seam" between the reflectors.

Note that top inward-facing reflector 12 and the two lateral inward-facing reflectors 2, 10 may completely subtend a half-space within the low-beam housing 31 above the longitudinal axis 39.

The remaining surface 4, 6 and 8, which may completely subtend a half-space within the low-beam housing 31 below the longitudinal axis 39, are less interesting optically, because it is intended that no light strike these surfaces. Surfaces 4, 6 and 8 normally have a non-reflective finish. Surface 4 and 8 may be referred to as lateral sides of the low-beam housing 31, which meet the bottom side 6 of the low-beam housing 31 at respective curves of intersection 5 and 7. Note that surfaces 2 and 4 may simply be parts of the same plane but with different surface treatments, with the lateral inward-facing reflector 2 requiring a shinier surface than the lateral side 4. The curve of intersection 3 may simply be an edge of the shiny surface. A similar condition holds for curve 9.

Having discussed the low-beam portion 30, we now discuss the high-beam portion 40.

In general, the high-beam optics may be simpler than the low-beam optics, because there is no requirement for a sharp bright/dark edge. It is assumed that the high-beams are only used when there is no oncoming traffic, so that the high-beam light may freely extend above the horizon and into the opposite side of the road. The high-beam portion 40 is shown in cross-section in FIG. 4, and the high-beam housing is shown end-on in FIG. 5. Both of these figures show a slightly simpler optical layout than the corresponding low-beam FIGS. 2 and 3.

The high-beam LED array 43 may be similar in function and construction to the low-beam LED array 33. Light from the high-beam LED array 43 is received by the high-beam housing 41, where it may pass directly through the housing 41 or undergo a reflection, refracts at the planar side 47 of plano-convex lens 42, and refracts out of the lens 42 at the convex side 48 of the lens 42. The high-beam longitudinal axis 49 may be parallel to the low-beam longitudinal axis 39, and both may coincide with a horizon.

Note that the convex side 48 of the lens 42 may have a slightly different shape than the convex side 38 of low-beam lens 32. Both may have originated using an aspheric collimator as a starting point, but each lens is typically optimized in performance for its particular use.

One difference between the low-beam and high-beam portions 30, 40 is that there is light passing through both top and bottom halves of the lens 42, because it is desirable to have high-beam light both below and above the horizon. In contrast, some light goes through the bottom half of low-beam lens 32, but its incidence angle is such that even when bent up by lens 32 it still turns out at or below the horizon.

As a result, there is no need in the high-beams for the step-like upward-facing reflectors used in the low-beams.

Instead, the upward-facing reflectors are replaced with a bottom inward-facing high-beam reflector 106, which functions much like top inward-facing reflector 112 in reflecting light that would otherwise miss the lens 42 toward the lens 42.

Figure 4:
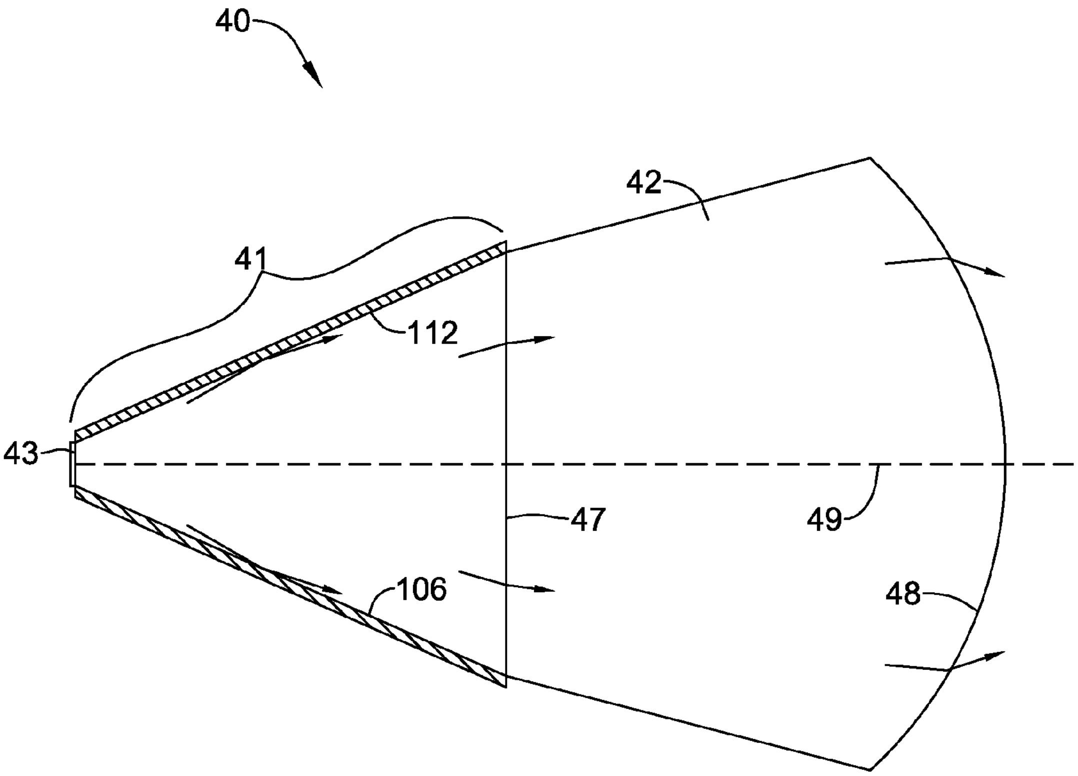
FIG. 4 is side-view cross-sectional drawing of the high-beam portion of the headlight of FIG. 1.

The geometry is shown more clearly in FIG. 4, which also attempts to clock-like numbering for simplicity.

At 12 o'clock and 6 o'clock are top and bottom inward-facing reflectors 112, 106. At 3 o'clock and 9 o'clock are later inward facing high-beam reflectors 103, 109, which meet the top and bottom inward-facing reflectors 112, 106 along curves of intersection 101, 105, 107 and 111.

Figure 5:
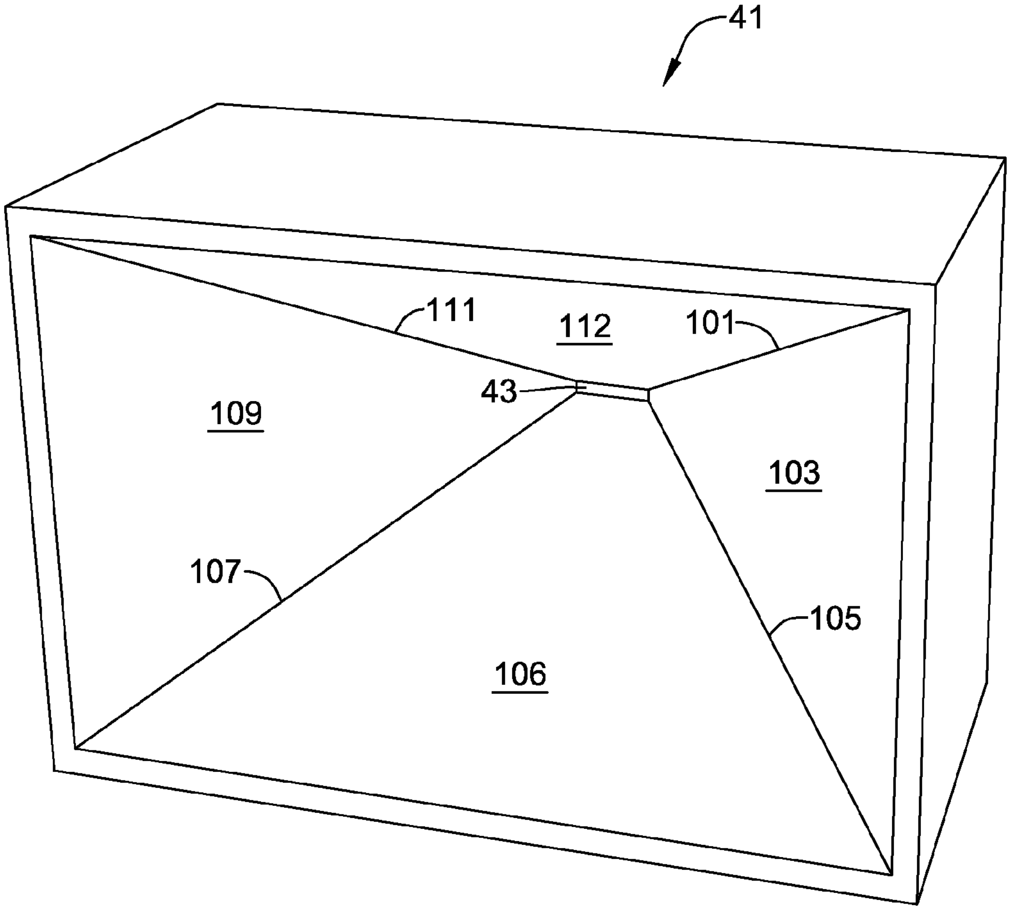
FIG. 5 is a perspective drawing showing the high-beam housing of the headlight of FIG. 1.

Note that in FIG. 5, the inward-facing high-beam reflectors 103, 106, 109 and 112 are arranged as the four sides of a pyramid, where the high-beam LED array 43 is at the apex and the high-beam lens 42 is at the base. Note that in FIG. 3, the pyramid-like geometry is incomplete.

It is understood that there may be variations from the specific designs shown in FIGS. 1-5. For instance, the four-sided geometry may be replaced with six sides, eight sides, or any number of integral sides and/or rounded edges.

Unless otherwise stated, use of the words "substantial" and "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one, of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

GLOSSARY

A Non-Limiting Summary of Above Reference Numerals

1 curve of intersection between top inward-facing reflector of low-beam housing and lateral inward-facing reflector of low-beam housing
2 lateral inward-facing reflector of low-beam housing
3 curve of intersection between lateral inward-facing reflector of low-beam housing and lateral side of low-beam housing
4 lateral side of low-beam housing
5 curve of intersection between lateral side of low-beam housing and bottom side of low-beam housing
6 bottom side of low-beam housing
7 curve of intersection between lateral side of low-beam housing and bottom side of low-beam housing
8 lateral side of low-beam housing
9 curve of intersection between lateral inward-facing reflector of low-beam housing and lateral side of low-beam housing
10 lateral inward-facing reflector of low-beam housing

11 curve of intersection between top inward-facing reflector of low-beam housing and lateral inward-facing reflector of low-beam housing
12 top inward-facing reflector of low-beam housing
20 headlight
30 low-beam portion of headlight
31 low-beam housing
32 low-beam lens
33 low-beam LED array
34 first upward-facing reflector
35 second upward-facing reflector
36 optically unimportant vertical surface in low-beam housing
37 planar side of low-beam lens
38 convex side of low-beam lens
39 longitudinal axis of low-beam housing
40 high-beam portion of headlight
41 high-beam housing
42 high-beam lens
43 high-beam LED array
47 planar side of high-beam lens
48 convex side of high-beam lens
49 longitudinal axis of high-beam housing
101 curve of intersection between top inward-facing reflector of high-beam housing and lateral inward-facing reflector of low-beam housing
103 lateral inward-facing high-beam reflector of high-beam housing
105 curve of intersection between bottom inward-facing reflector of high-beam housing and lateral inward-facing reflector of low-beam housing
106 bottom inward-facing high-beam reflector of high-beam housing
107 curve of intersection between bottom inward-facing reflector of high-beam housing and lateral inward-facing reflector of low-beam housing
109 lateral inward-facing high-beam reflector of high-beam housing
111 curve of intersection between top inward-facing reflector of high-beam housing and lateral inward-facing reflector of low-beam housing
112 top inward-facing reflector of high-beam housing

What is claimed is:

1. A headlight (20) having a low-beam housing (31), the low-beam housing (31) having a generally horizontal longitudinal axis (39), the low-beam housing (31) receiving light from an LED array (33) and delivering the light to a transmissive lens (32), a receiving face of the lens (32) and an emission face of the LED array (33) both having generally rectangular perimeters with generally horizontal and vertical peripheral edges, the low-beam housing (31) comprising:

a top inward-facing reflector (12) extending from a top peripheral edge of the LED array (33) to a top peripheral edge of the lens (32);

two lateral inward-facing reflectors (2, 10), each lateral inward-facing reflector (2, 10) extending from a side peripheral edge of the LED array (33) to a corresponding side peripheral edge of the lens (32), each lateral inward-facing reflector (2, 10) intersecting the top inward-facing reflector (12) along a curve (1, 11); and a first upward-facing reflector (34) extending away from the LED array (33) toward the lens (32), the first upward-facing reflector (34) being generally planar, generally horizontal, and disposed below the longitudinal axis (39);

wherein the first upward-facing reflector (34) receives low-beam light from the LED array (33) and reflects the low-beam light upward toward the lens (32) and toward the top inward-facing reflector (12).

2. The headlight (20) of claim 1, wherein the first upward-facing reflector (34) extends far enough toward the lens (32) so that substantially all the downward-propagating light from the LED array (33) initially strikes either the receiving face of the lens (32) or the first upward-facing reflector (34).

3. The headlight (20) of claim 1, further comprising:

a second upward-facing reflector (35) extending away from the first upward-facing reflector (34) toward the lens (32), the second upward-facing reflector (35) being generally planar, generally horizontal, and disposed below the first upward-facing reflector (34);

wherein the second upward-facing reflector (35) receives low-beam light from the LED array (33) and reflects the low-beam light upward toward the lens (32) and toward the top inward-facing reflector (12).

4. The headlight (20) of claim 3, wherein the second upward-facing reflector (35) extends far enough toward the lens (32) so that substantially all the downward-propagating light from the LED array (33) initially strikes either the receiving face of the lens (32) or exactly one of the first and second upward-facing reflectors (34, 35).

5. The headlight (20) of claim 1, further comprising:

a plurality of upward-facing reflectors, each upward-facing reflector in the plurality being generally planar and generally horizontal, the upward-facing reflectors in the plurality being arranged as descending steps from the LED array (33) toward the lens (32);

wherein the plurality of upward-facing reflectors extends far enough toward the lens (32) so that all the downward-propagating light from the LED array (33) initially strikes either the receiving face of the lens (32) or exactly one upward-facing reflector in the plurality.

6. The headlight (20) of claim 1, wherein the top inward-facing reflector (12) and the two lateral inward-facing reflectors (2, 10) are all generally planar.

7. The headlight (20) of claim 1, wherein the top inward-facing reflector (12) and the two lateral inward-facing reflectors (2, 10) completely subtend a half-space within the low-beam housing (31) above the longitudinal axis (39).

8. The headlight (20) of claim 1, further comprising the LED array (33).

9. The headlight (20) of claim 8, wherein the LED array (33) is elongated horizontally and is generally centered on the longitudinal axis (39).

10. The headlight (20) of claim 1, further comprising the lens (32).

11. The headlight (20) of claim 10, wherein the lens (32) is aspheric.

12. The headlight (20) of claim 10, wherein the lens (32) is plano-convex, with the planar side (37) facing the low-beam housing (31).

13. The headlight (20) of claim 1, further comprising a high-beam housing (41) disposed adjacent to the low-beam housing (31) and having a horizontal longitudinal axis (39) parallel to that of the low-beam housing (31).

14. The headlight (20) of claim 13, wherein the high-beam housing (41) receives light from a high-beam LED array (43) and delivers the light to a transmissive high-beam lens (42);

wherein a receiving face of the high-beam lens (42) and an emission face of the high-beam LED array (43) both have generally rectangular perimeters with generally horizontal and vertical peripheral edges, and wherein the high-beam housing (41) comprises:

a top inward-facing high-beam reflector (112) extending from a top peripheral edge of the high-beam LED array (43) to a top peripheral edge of the high-beam lens (42);

a bottom inward-facing high-beam reflector (106) extending from a bottom peripheral edge of the high-beam LED array (43) to a bottom peripheral edge of the high-beam lens (42); and two lateral inward-facing high-beam reflectors (103, 109), each lateral inward-facing high-beam reflector (103, 109) extending from a side peripheral edge of the high-beam LED array (43) to a corresponding side peripheral edge of the high-beam lens (42), each lateral inward-facing high-beam reflector (103, 109) intersecting the top inward-facing high-beam reflector (112) along a curve (101, 111) and intersecting the bottom inward-facing high-beam reflector (106) along a curve (105, 107).

15. The headlight (20) of claim 14, wherein the top (112), bottom (106) and two lateral (103, 109) inward-facing high-beam reflectors are planes arranged as the sides of a pyramid;

wherein the high-beam LED array (43) is disposed proximate an apex of the pyramid; and wherein the high-beam lens (42) is disposed proximate a base of the pyramid.

* * * * *